US007424676B1

(12) United States Patent
Carlson et al.

(10) Patent No.: US 7,424,676 B1
(45) Date of Patent: Sep. 9, 2008

(54) SYSTEM AND METHOD FOR IMPROVED ELECTRONIC MAIL PROCESSING WITH INTRODUCTORY TEXT

(75) Inventors: Andrew G. Carlson, Woodinville, WA (US); Valerie D. Serdy, Redmond, WA (US); Noah Egorin, Arlington, VA (US); Sean Erik McAteer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 523 days.

(21) Appl. No.: 09/595,734

(22) Filed: Jun. 16, 2000

(51) Int. Cl.
*G06F 17/00* (2006.01)
*G06F 17/20* (2006.01)
(52) U.S. Cl. .................................................. 715/273
(58) Field of Classification Search ................ 715/526, 715/530, 531, 512, 273; 709/206; 707/206
See application file for complete search history.

(56) References Cited

U.S. PATENT DOCUMENTS

| 5,146,552 | A  | * | 9/1992  | Cassorla et al. | 715/512 |
| 5,406,557 | A  | * | 4/1995  | Baudoin | 370/407 |
| 5,438,660 | A  | * | 8/1995  | Lee et al. | 715/797 |
| 5,818,447 | A  | * | 10/1998 | Wolf et al. | 345/752 |
| 5,903,723 | A  | * | 5/1999  | Beck et al. | 709/200 |
| 6,014,688 | A  | * | 1/2000  | Venkatraman et al. | 709/206 |
| 6,073,166 | A  | * | 6/2000  | Forsen | 709/206 |
| 6,192,396 | B1 | * | 2/2001  | Kohler | 709/206 |
| 6,247,045 | B1 | * | 6/2001  | Shaw et al. | 709/207 |
| 6,385,655 | B1 | * | 5/2002  | Smith et al. | 709/232 |
| 6,529,942 | B1 | * | 3/2003  | Gilbert | 709/206 |
| 6,563,913 | B1 | * | 5/2003  | Kaghazian | 379/93.24 |
| 6,751,670 | B1 | * | 6/2004  | Patterson | 709/229 |
| 6,816,887 | B1 | * | 11/2004 | Shaw et al. | 709/207 |
| 6,898,622 | B1 | * | 5/2005  | Malik | 709/206 |

OTHER PUBLICATIONS

Saiedian et al;"An Interface for Acquistion, Manipulation and Distribution of Mail and News Messages as Objects"; 1992; ACM; pp. 68-74.*
Microsoft, "Special Edition Using Microsoft Word 2000", Que Corporation, 1999.*
Borenstein, Nathaniel, "Computational Mail as Network Infrastructure for Computer-Supported Cooperative Work", 1992, ACM, pp. 67-74.*
Brewer, Robert S., "Improving Problem-Oriented Mailing List Archives with MCS", ACM, 200, pp. 95-104.*

\* cited by examiner

*Primary Examiner*—Doug Hutton
*Assistant Examiner*—James J Debrow
(74) *Attorney, Agent, or Firm*—Merchant & Gould; Ryan T. Grace

(57) ABSTRACT

An envelope provides the integration of the functionality of an email application program and the functionality of a document editor so that a sender can send introductory text to the recipient of an email message constituting a document without corrupting the original document. Users of document editors can generate and edit documents for email transmission by first creating the document with the document editor and then invoking an envelope to send the document as the message body with introductory text. The envelope has its own user interface that is fully functional within the confines of the document editor's user interface to provide the user with the functionality of the email client application program. The envelope includes an introduction field for the entry of introductory text by the sender. The introduction field in the envelope is a rich edit control in plain text mode, similar to the subject field of the envelope. When the user sends the document, the document editor prepends the introductory text to the body of the message. The document editor then converts the introductory text and the body of the document to an HTML message, and the email client sends the email message to the recipient.

14 Claims, 8 Drawing Sheets

SYSTEM AND METHOD FOR IMPROVED ELECTRONIC MAIL PROCESSING WITH INTRODUCTORY TEXT

TECHNICAL FIELD

The present invention relates to a system and method for handling electronic mail (email), and more particularly relates to a system and method for integrating the functionality of an email client program (email client) and a document editing program (document editor) which allows the user of the document editing program to send a document created by the document editing program along with instructions or other introductory information to the recipient of an email within the body of the email while preserving the integrity of the original document.

BACKGROUND OF THE INVENTION

Electronic mail (email) processing is a primary use of the Internet and intranets today. Internet and intranet users are replacing conventional paper correspondence with email. As a result, an email user tends to use his or her email application program (email client) as a document editing tool as well as for its original purpose of transmitting messages. As more and more documents are generated for the express purpose of transmission via email, email clients are becoming the document editors of choice, rather than word processing or other document editing programs (document editor). Unfortunately, email clients typically provide substandard document editing capabilities.

In the past there has been a tremendous difference between the editing and formatting options available for email messages and those available for documents generated by more sophisticated document editors. Email messages were generally restricted to the transmission of simple text and rely on formatting conventions that traced their history back to teletypes. For example, "emoticons" such as :-), abbreviations such as <G>, and suggestive formatting such as _underline_ and *bold* were some of the ways utilized to express emotion or to draw emphasis within simple text messages.

While the formatting options available to email client users have remained fairly basic, the formatting options and editing features provided by word processors and other document editing programs have dramatically increased. For example, with a full powered word processor, the user is able to apply a wide variety of editing and formatting options. In addition to the richer formatting, full powered word processors provide powerful editing features, such as background spell checking and automatic correction of common typographical errors. Full powered word processors also allow users to create increasingly sophisticated and complex documents that include drawing objects, text colored with a highlighter, borders, shading, tables, and special bullets. Similarly, other rich document editors, such as spreadsheet programs, database programs, and drawing programs provide document editing features far superior to even the most advanced email client available.

As the popularity of email has increased, five changes have taken place. First, some software publishers have added some rich editing capabilities to their email clients. Although this approach allowed a user to change the formatting used in an email message, it required the user to edit email messages in an environment that was different than the word processor or other document editor to which he or she was accustomed. In addition, the rich editor email clients simply do not possess the broad array of features common to sophisticated document editors.

A second approach has been to add some email capabilities to document editors. Although this approach simplified the process of sending a message that was created by the document editor, this approach presented several drawbacks. First, the recipient of the message needed to have a compatible document editor in order to read the message. Second, the document editing environment is disconnected from the email environment. Third, this approach does not make it easier to read incoming email from various sources. Fourth, this approach does not accommodate the sending of file attachments to plain text or basic rich text (down level) email clients.

A third approach has been one in which the user has decided to use a full power word processor or document editor for authoring sophisticated and complex documents, and then uses the email client for distribution. This requires the user to work in the word processing context to create and edit the document. When the document is complete, the user must switch to the email client, create a new message, and include the word processor document as an "attachment". Although email client is an effective mechanism for transporting documents, handling attachments requires several additional steps on the part of both the sender and the recipient of the message. Additionally, the attached document can only be used by a recipient of the message that has a compatible document editor in order to read the document.

A fourth approach has been one in which an email client invokes an object-enabled mail note to display an email message and related features of the user interface. The mail note provides a view port in which the document editor displays and edits the body of the email message. The document editor provides its formatting and editing features in the context of the mail note. Programming interfaces between the mail note and the document editor allow the mail note to translate message data back and forth between the document editor's format and the format imposed by the email client. This allowed messages created with a document editor to be read by email clients. Unfortunately, this approach is inefficient because it requires a great deal of communication between the email client and the document editor, which reduces efficiency and consumes processor resources. Furthermore, this approach confuses users as to the availability of various functions of the email client and/or the document editor.

A fifth approach employs an envelope data architecture to provide the functionality of an email client within the user interface of a document editor (e.g., word processor, spreadsheet, database, etc.). The user can invoke the envelope to access the email client's functionality within the context of the document editor's user interface.

An envelope user interface is displayed to integrate the functionality of an email client within the user interface of the document editor. Within the envelope user interface, the user defines the parameters (recipient, cc, bcc, subject) by which the email client will transmit the email message. Message body data is also created by the sender using the document editor, and the message body data constitutes the body of the email message. The envelope can be invoked by the sender while using the document editor's user interface, and invoking the envelope causes the email client to transmit the email message in response to the user's command. All message body data and envelope data can be saved with a document, so that such data is available when the user recalls the document for a subsequent editing session. Such an envelope architecture is disclosed in Apfel et al., U.S. patent application Ser.

No. 09/098,778, filed Jun. 17, 1998, entitled "System And Method For In-Place Editing Of An Electronic Mail Message Using A Separate Program" and assigned to Microsoft Corporation of Redmond, Wash., the assignee of the present invention. The Apfel et al. application is incorporated herein by reference.

The envelope architecture described above provides the environment for the present invention. A sender, using the envelope architecture, may wish to instruct a recipient with respect to the purpose for emailing a particular document (e.g., a slide created using PowerPoint slide presentation software or a spreadsheet created using Excel spreadsheet software, both manufactured and sold by Microsoft Corporation of Redmond, Wash., the assignee of the present invention) to the recipient. Most email users have a specific reason for sending a document to a particular recipient. For example, the user may be sending the document for the recipient for reviewing or editing.

To communicate such instructions or introductory text, a sender may insert extra space into the document and type instructions or introductory text above the actual content (i.e., body) of the document. By using this approach for sending instructions or introductory text, the sender must later delete the introductory text on his or her copy of the document to preserve the integrity of the document that he or she has just sent. Similarly, before the recipient can edit the document, he or she must likewise delete the introductory text. This approach to communicating instructions or other introductory text is onerous and inefficient. Furthermore, a user of Excel spread sheet software or PowerPoint slide presentation software cannot use this approach because in those applications additional space for inserting instructions or an introduction is not readily available.

Hence, there is a need in the art for a system and method that will allow the sender of a document via email to transmit a document created by a document editor along with instructions or an introduction without corrupting the text of the original document.

SUMMARY OF THE INVENTION

The present invention satisfies the above-described needs by providing a system and method for integrating the functionality of an email program (e.g., an email client) into a document editor (e.g., word processor) so that the user can send a document with introductory text for the recipient. Particularly, the sender of a document with introductory text for the recipient can invoke an envelope to access the email client's functionality within the context of the document editor's user interface. Particularly, a field, entitled the "introduction field", is presented to the sender as part of the envelope's user interface. The introduction field of the envelope can be used for instructions or other pertinent introductory text directed to the recipient. The introduction field in the envelope is part of the mail header of the email message. The introduction field in the envelope is a rich edit control in plain text mode, similar to the subject field of the envelope. The introduction field offers a space for the sender of an email message to include introductory text to send with the document that has been created in the document editor. The introductory text that is entered in the introduction field is not included in the body of the document that the sender created with the document editor. Instead, the introductory text is appended to the body of the message. In one embodiment, the introductory text is prepended to the body of the message and is separated from the body of the message by a line (horizontal rule).

In order to send a document with an introduction to a recipient, the sender first activates the envelope from within the document editor. The sender then enters the email header information (e.g. To, cc, bcc, subject). The sender also enters the introductory text into the introduction field in the envelope. The introduction field may include enhance word processing services, such as auto complete, auto correct services, or other services.

Once the introduction field has been filled in, the sender clicks the send icon. The envelope calls the rich edit control of the introduction field to retrieve the introductory text from the introduction field and passes the introductory text to the document editor. The envelope is able to detect within the introductory text certain text properties, such as hyperlinks, bold, italic, and different fonts. The envelope recognizes, processes, and passes those text properties to the document editor. The document editor receives the introductory text including the text properties, and the document editor appends (prepends) the introductory text to the body of the document. The document editor then converts the introductory text and the body of the document to an HTML message so that the message and introductory text can be displayed by email clients without the need to have a copy of the document editor that created the original message body. Once this process is complete, the document editor transfers the HTML email message, including the message body and the introductory text, to the email client (e.g., Outlook email manufactured and sold by Microsoft Corporation of Redmond, Wash., the assignee of the present invention.). The email client is responsible for sending the email message to the recipient.

The various aspects of the present invention may be more clearly understood and appreciated from a review of the following detailed description of the disclosed embodiments and by reference to the drawings and claims.

DETAILED DESCRIPTION

Figure 1:
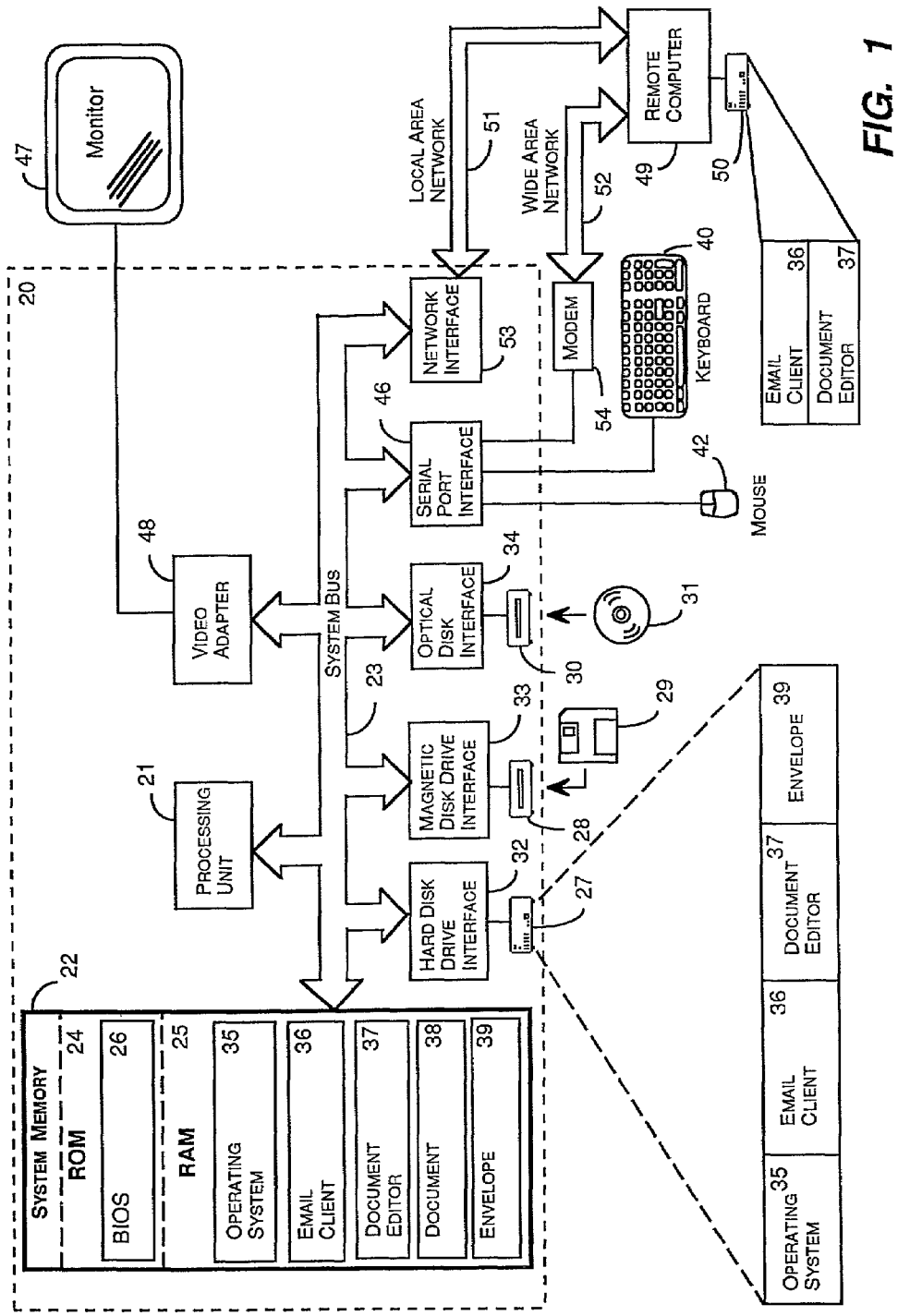
FIG. 1 is a block diagram of a computer system that provides the operating environment for an illustrative embodiment of the present invention.

The present invention is directed to a system and method for integrating the functionality of an email program (e.g., an email client) into a document editor (e.g., word processor), such that the functionality of the email client is available to a user while the user is editing a document in the document editor. More particularly, the integrated functionality of the email client allows the user of the document editor to send a document created with the document editor as the body of an email message with introductory text appended (prepended)

to the body of the email message. Generally described, the present invention employs an envelope data architecture to provide the functionality of the email client within the user interface of the document editor (e.g., word processor, spreadsheet, database, etc.). Instead of creating the document in the document editor and then sending the document as an attachment to an email note in the email client, the user of the document editor can invoke the envelope and access the email client's functionality within the context of the document editor's user interface. Particularly, the envelope of the present invention includes an introduction field in which the sender of a document can insert introductory text for the recipient of the email.

Those skilled in the art will appreciate that an illustrative embodiment of the present invention relies on and incorporates several common features of modern personal computers. In order to provide a sufficient background for an embodiment of the present invention, it is useful to first discuss a variety of topics, including an illustrative operating system, the Object Linking and Embedding (OLE) interface, the Messaging Application Programming Interface (MAPI), and the Envelope architecture. An illustrative embodiment of the present invention will be described within the context of each of these components.

Referring now to the drawings, in which like numerals represent like elements throughout the several figures, aspects of the present invention and an illustrative operating environment will be described.

An Illustrative Operating Environment

FIG. 1 and the following discussion are intended to provide a brief, general description of a suitable computing environment in which the invention may be implemented. While the invention will be described in the general context of an application program that runs on an operating system in conjunction with a personal computer, those skilled in the art will recognize that the invention also may be implemented in combination with other program modules. Generally, program modules include routines, programs, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an illustrative system for implementing the invention includes a conventional personal computer 20, including a processing unit 21, a system memory 22, and a system bus 23 that couples the system memory to the processing unit 21. The system memory 22 includes read only memory (ROM) 24 and random access memory (RAM) 25. A basic input/output system 26 (BIOS), containing the basic routines that help to transfer information between elements within the personal computer 20, such as during start-up, is stored in ROM 24. The personal computer 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer 20. Although the description of computer-readable media above refers to a hard disk, a removable magnetic disk, and a CD-ROM disk, those skilled in the art will appreciate that other types of media which are readable by a computer, such as magnetic cassettes, flash memory cards, digital video disks, Bernoulli cartridges, and the like may also be used in the illustrative operating environment of FIG. 1.

A number of program modules may be stored in the drives and RAM 25, including an operating system 35, one or more email client application programs 36 (email client), a document editing application program 37 (document editor), documents 38, and any number of other program modules, including an envelope program module 39 (envelope). A user may enter commands and information into the personal computer 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers.

The personal computer 20 may operate in a networked environment using logical connections to one or more remote computers, such as a remote computer 49. The remote computer 49 may be a server, a router, a peer device, or other common network node, and the remote computer 49 typically includes many or all of the elements described relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the LAN 51 through a network interface 53. When used in a WAN networking environment, the personal computer 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. Those of ordinary skill in the art will appreciate that the network connections shown are illustrative, and other means of establishing a communications link between the computers may be used.

An illustrative embodiment of the present invention is represented by the "MICROSOFT OUTLOOK" and "MICROSOFT OUTLOOK EXPRESS" email clients and document editors including the "MICROSOFT WORD" word processing application program, the "MICROSOFT EXCEL" spreadsheet application program, the "MICROSOFT ACCESS" database application program, and the "MICROSOFT POWERPOINT" graphical presentation application program. However, one should understand that the present invention can be implemented by various program modules and/or application programs for use with various operating systems.

The OLE Interface

The Microsoft Corporation manufactures and distributes an interface known as the Object Linking and Embedding (OLE) interface, which is supported by the "MICROSOFT WINDOWS 95" and "MICROSOFT WINDOWS NT" operating systems. OLE is a technology that enables developers to create extendable application programs that operate across multiple platforms. OLE-enabled applications allow users to manipulate information in an intuitive manner, using an environment that is more "document-centric" and less "application-centric". Users can create compound documents with data, or objects, of different formats, and focus directly on the data rather than on the application programs responsible for generating the data. The data can be embedded within the document, or linked to it, so that only a reference to the data is actually stored as part of the document itself.

OLE facilitates application integration by defining a set of standard interfaces, which are groupings of semantically-related functions through which one program module (or application program) accesses the services of another. OLE is an open system in the sense that any application program can provide an implementation of a defined interface and any application program can use it. Application programs can either take advantage of built-in functionality provided by OLE, or add to it or replace it as best suits their needs.

The set of OLE services can be viewed as a two tier hierarchy. The lower level contains infrastructure services. These are basic services that provide the means by which features can be implemented and used. The infrastructure services include interface negotiation, memory management, error and status reporting, interprocess communication, structured storage, and data transfer. The upper level of the OLE service hierarchy provides application features, which are the services that benefit the end user. These include compound document management, in-place activation, programmability, and drag and drop operations.

OLE's interfaces provide the standard for component object interaction. Each interface contains a set of functions that defines a contract between the object implementing the interface and the client using it. The contract includes the name of the interface, the function names, and the parameter names and types. Under this contract, the object must implement all of the functions defined for that interface and the implementations must conform to the contract. Generally, a component object is said to make a "function call" when it contracts with another object to implement one or more functions.

Standard OLE interface names are prefixed with either "I" or "IOle." Interfaces that begin with "IOle" provide services relating to compound document management. Those that begin with "I" provide services that are more general in nature. For example, IOleObject contains methods used by a client of an embedded or linked compound document object. IOleObject is implemented and used only by applications that participate in compound document management. IdataObject, however, contains methods that are used by all applications. These methods provide the means by which data of any type is transferred. To these standard OLE interface names, the Microsoft Corporation has added a series of interface names, designed to operate in conjunction with its "MICROSOFT OFFICE" application program. These interface names begin with "IMso"

OLE supports a "compound document," which is a container object that contains a "linked" object or an "embedded" object. The difference between linked and embedded objects relates to where the actual source data associated with the object is stored. This affects the object's portability, its method of activation, and the size of the compound document.

When an object is linked, the source data continues to reside wherever it was initially created, which may be at another point in the document or in another document altogether. Only a reference, or link, to the object is kept within the compound document. Linking is efficient and minimizes the size of the compound document. Changes made to the source are automatically reflected in any compound document that has a link to the source object. From the user's point of view, a linked object appears to be wholly contained within the document.

With an embedded object, a copy of the original object is physically stored in the compound document, along with all of the information needed to manage that object. As a result, the object becomes a physical part of the document. A compound document containing an embedded object will be larger than one containing the same objects as links. However, embedding offers advantages that offset the larger storage requirement. For example, compound objects with embedded objects can be transferred to another computer and edited there.

Embedded objects can be edited or activated in place. This means that all maintenance of the object can be done without leaving the compound document. In order to edit the embedded object, the object must be explicitly activated or opened by performing an action such as double-clicking on the object's icon. This action results in the object being displayed in a separate window with the user interface provided by the application program that created the object. The object is said to become in-place active (i.e., it is editable) and UI active (i.e., it displays the user interface associated with the application program that created the embedded object).

In summary, OLE allows objects to be embedded in a compound document. Generally, the embedded document is displayed in a container in what is referred to as the object view. The container controls the appearance of the page and the layout of headers, footers, end notes, etc. The embedded object has no control over these aspects of the page. The container also controls the amount of space that is allocated to the embedded object for displaying its pictorial representation. In the context of the present invention, an object, referred to as the envelope, is embedded within a document and provides a user interface enabling the transmission of the document as an email message.

The MAPI Messaging Architecture

In an illustrative embodiment of the present invention, the envelope is provided in the form of a mail note that is used to send and receive email messages. A significant portion of the mail note's activity involves interacting with an email client application program, such as "MICROSOFT OUTLOOK". In an illustrative embodiment, the operating system supports, and the email client complies with, the Messaging Application Programming Interface (MAPI). The MAPI architecture is designed to make it easy for programmers to write messaging-enabled applications that are independent of the underlying messaging system. MAPI provides high-level functions that can be used to implement sophisticated messaging features with a relatively small amount of code. The code deals only with functions for sending, receiving, and addressing messages. The underlying messaging system is completely transparent. MAPI also provides other message-related functionality, such as access to address books.

Figure 2:
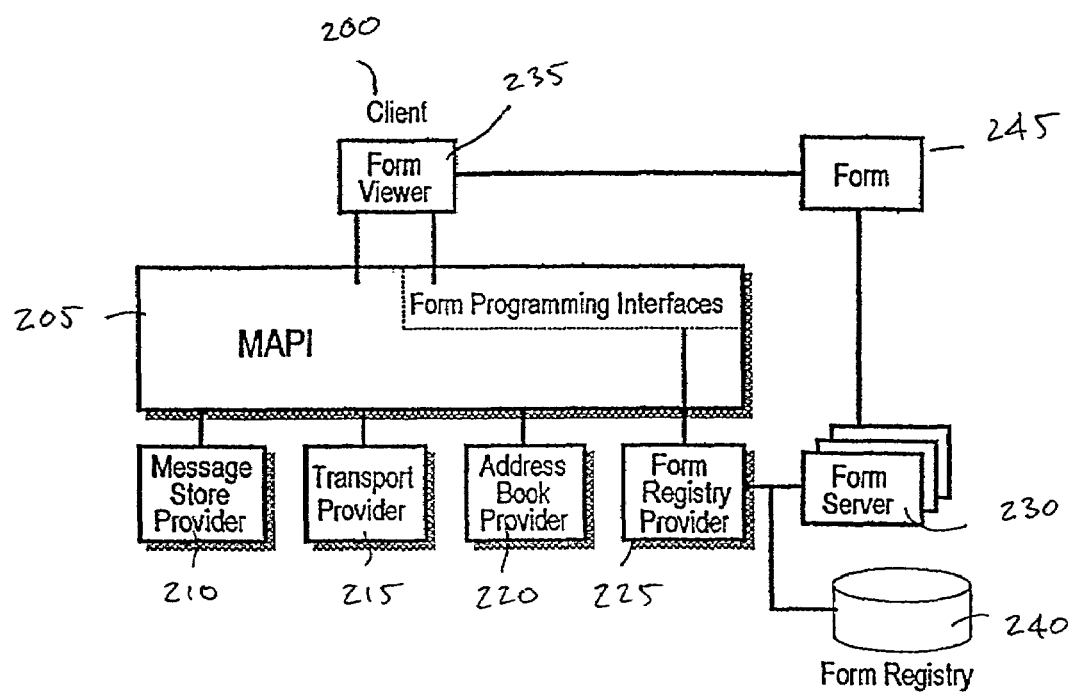
FIG. 2 is a block diagram depicting the major components of an illustrative Messaging Application Programming Interface (MAPI).

FIG. 2 illustrates portions of the modular architecture defined by MAPI. An email client 200 is an application program that takes advantage of the MAPI subsystem 205. The MAPI subsystem 205 is made up of a MAPI spooler, a common user interface, and programming interfaces. The MAPI spooler is a separate interface that is responsible for sending messages to and receiving messages from a messaging system. The common user interface is a set of dialog boxes that gives email clients a consistent look and users a consistent way to perform tasks.

The programming interfaces are used by the MAPI subsystem 205, by an email client 200, and by service provider writers. The main programming interface is an object-based interface known as the MAPI programming interface, which is based on the OLE Component Object Model.

The MAPI spooler is a separate process within the MAPI subsystem 205 and is responsible for sending messages to and receiving message from a messaging system. The spooler runs as a background process and also performs several functions related to messaging distribution. These include informing an email client when a new message has been delivered, invoking message preprocessing and post processing, generating reports that indicate that message delivery has occurred, and maintaining status on processed recipients.

MAPI service providers are located between MAPI subsystem 205 and the messaging system (not shown). Service providers are drivers that connect MAPI email clients 200 to an underlying messaging system. Most messaging systems include three types of service providers: message store providers 210, address book or directory providers 220, and message transport providers 215. The service providers work with MAPI to create and send messages in the following way. Messages are created using a form 245 that is appropriate for the specific type, or class, of message. The completed message is addressed to one or more recipients. When the client sends the message, the message store provider 210 checks that each recipient has a unique and valid address and that the message has all of the information necessary for transmission. If there is a question about a recipient, such as can occur when there are multiple recipients with the same name, an address book provider resolves the ambiguity. The message is then placed in the outbound queue.

Address book providers 220 handle access to directory information. Depending on the type of recipient and the address book provider, there is a wide range of information that can be made available. For example, all address book providers 220 typically store a recipient's name, address, and address type and organize the data using one or more containers. MAPI integrates all the information supplied by the installed address book providers into a single address book, thereby presenting a unified view to the email client.

Message store providers 210 handle the storage and retrieval of messages and other information for the users of email clients. The message information is organized using a hierarchical system known as a message store, which is implemented in multiple levels, with containers called folders holding messages of different types.

Transport providers 215 handle message transmission and reception. They control the interaction between the MAPI spooler and the underlying messaging system. They also implement security if necessary and take care of any preprocessing and post-processing tasks that are required. Email clients 200 communicate with the transport providers 215 through a message store provider 210. When an incoming message is detected, the transport provider 215 informs the MAPI spooler and the message is delivered to the appropriate message store. To handle outgoing messages, the message store moves the message to the outbound queue, informs the MAPI spooler, and the spooler transfers it to the appropriate transport providers.

Email client users can access a summary view of the messages contained within each folder or view the messages individually using a form 245. Whether the client displays a standard form supplied by MAPI or a custom form supplied by a form developer depends on the type, or class, of the message. Messages are the units of data transferred from one user to another. Every message contains some text, which is formatted simply or more intricately depending on the form that is used, and envelope information that is used for transmission.

Every custom form implements a set of standard menu commands (e.g., open, create, delete, reply, and forward) and a set of commands that are specific to that particular form. The MAPI form architecture involves three main components: a form registry provider 225, a form server 230, and a form viewer 235.

The form registry provider 225 maintains a library of information about all of the forms available on the computer and enables the client to select a form that is suitable for the message being displayed. Form data is stored in a form registry 240, which is stored in one of the computer's memory storage devices. The form server 230 is responsible for displaying the form and providing the information for the display. The form server manages the user's interaction with the form by interpreting the menu selections and processing the messages. The form viewer 235 is a component within an email client that contains the display and presents it to the user.

From the foregoing, it will be appreciated that MAPI provides a wide variety of features and functions in addition to those included in the brief description presented above. For additional information regarding MAPI, the reader may refer to the MAPI documentation, entitled Messaging Application Programming Interface (MAPI) version 1.0, which is published by Microsoft. Corporation, and which is incorporated herein by reference. Those skilled in the art will appreciate that the MAPI messaging API (Application Programming Interface) is but one means of implementing an illustrative embodiment of the invention. The present invention may be implemented with virtually any messaging API.

The Envelope

Figure 3:
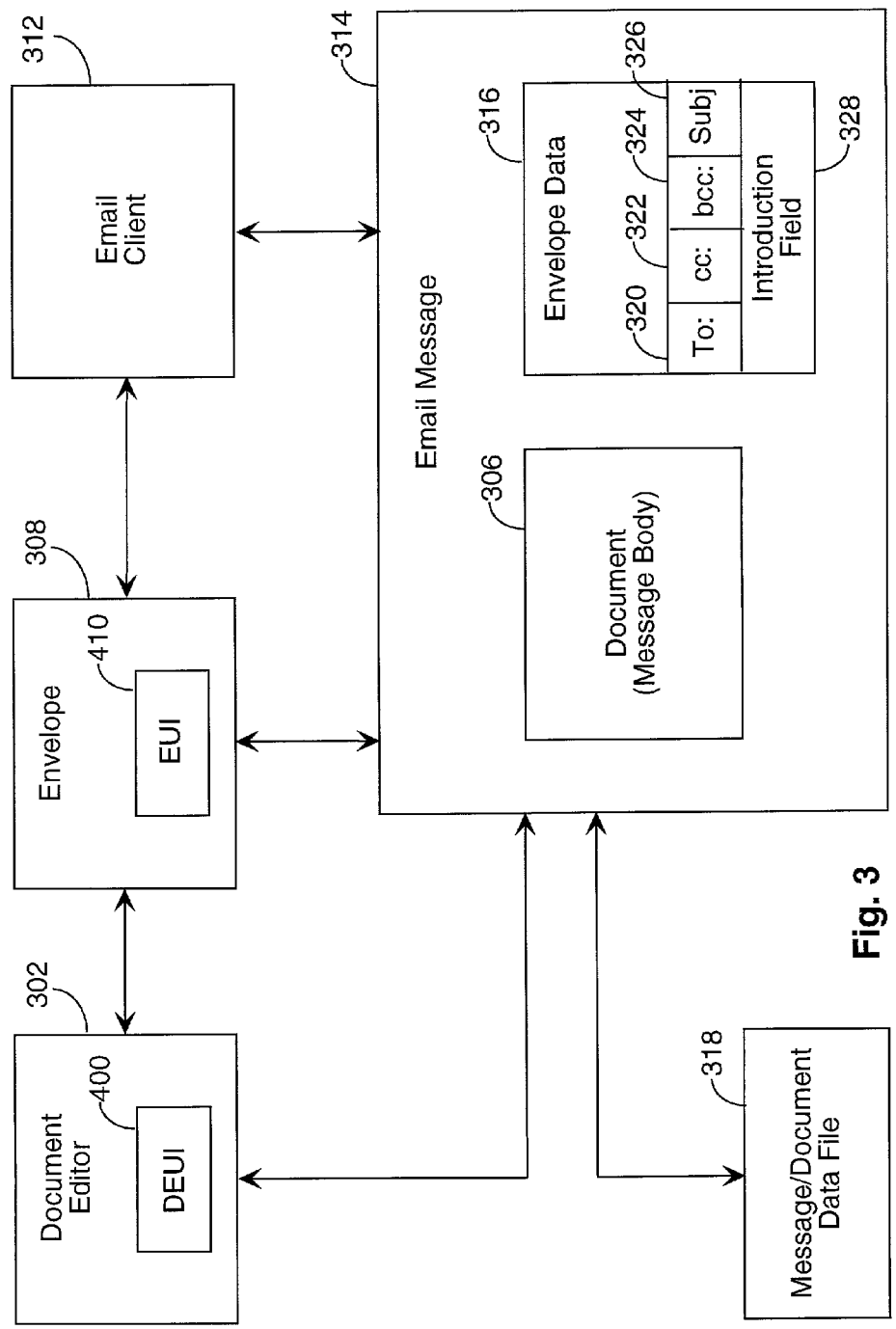
FIG. 3 is a block diagram depicting the major components of an illustrative embodiment of the present invention.

In one embodiment of the present invention, the functionality of an email client can be integrated into a document editor's user interface (DEUI) so that the functionality of the email client is available to a user of the document editor. In this context, the need for functionality integration will commonly arise in two situations: where the user is operating the document editor and wishes to send an edited document to a recipient or where the user is operating the email client and wishes to employ the rich editing functionality of the document editor. In either instance, the sender may want to send some introductory information along with the document created using the document editor. FIG. 3 depicts a block diagram of the major components utilized by an illustrative embodiment of the present invention to provide for such functionality integration.

Generally stated, the envelope of an illustrative embodiment of the present invention is an object including computer-executable instructions and data for executing those instructions. The envelope serves as a conduit between a document editor and an email client, such that the functionality of the email client is provided within the Graphical User Interface of the document editor, while the data necessary to transmit a document as an email message is provided to the email client. In this illustrative embodiment, the email client can transmit the email message according to the data provided by the envelope.

The envelope concept is more efficient that other functionality integration models, because the envelope embeds (using OLE) a small User Interface object into the document editor, rather than a large object embodying an entire application program (e.g., an email client). In previous functionality integration models, an entire document editor would be embedded into an email note of the email client as an object and the document editor would receive data from the embedded object.

Turning to FIG. 3, the major components of the system of the present invention are shown and include a document editor 302, an email client 312, and an envelope 308. Typically, the document editor 302 will have its own user interface, document editor user interface (DEUI) 400. In the first situation mentioned above, the user operates the document editor 302 by interacting with the DEUI 400, to generate and/or edit a document 306. The envelope 308 supplies the functionality of the email client 312 to the document editor 302 and the DEUI 400. The envelope 308 has its own user interface, the envelope user interface (EUI) 410. The EUI 410 provides any type of command bar controls (e.g., toolbars, menus, etc.) needed to integrate the functionality of the email client 312. Once the envelope 308 has been invoked, the EUI 410 will be accessible to the user of the document editor 302 and will provide the means by which the functionality of the email client 312 is invoked.

When the envelope 308 has been invoked, the document 306 can be made part of an email message 314. The portion of the email message 314 containing the document 306 is referred to as the message body or the message content. Just as the document editor 302 can be a word processor, a spreadsheet program, a graphical presentation program or any other document generator, the document (message body) 306 can consist of text, formulas, graphics, and any other matter capable of being reproduced by a computer.

Another portion of the email message 314 is the envelope data 316 portion. The envelope data 316 contains information that is used by the email client 312 to transmit the email message and is also referred to as the message address data. For example, the envelope data 316 typically includes addressee data 320, subject data 326, carbon copy recipient data 322, blind copy recipient data 324, and other information pertaining to the transmission and delivery of the email message. In accordance with the present invention, the envelope data 316 also includes introduction field 328 which may include introductory text or other introductory information.

The introduction field 328 is a rich-edit control in plain text mode, similar to the subject field 326. In one embodiment, the introduction field is sized to contain three lines of text at the default size of the subject field. The amount of text can be preset, but a maximum of 32 kilobytes of text should allow sufficient space to accommodate ordinary sender introductions for a document. If the user exceeds the limit, an audible warning is sounded, and no further introductory text is accepted in the introduction field. The introduction field may also include one or more rich-edit services such as "auto complete", "auto correct", or "auto detect hyperlink". Such services are well known and used in connection with many document editors or word processors.

The introduction field 328 will also support copy/paste and drag/drop functions. If plain text is on the clipboard, that plain text will be pasted into the introduction field. If the clipboard has plain text and an item that is not plain text, the plain text will be pasted into the introduction field 328. The item that is not plain text, however, will not be pasted into the introduction field 328, and a warning will be displayed. When the user saves the envelope 308 by saving the document 306, any text in the introduction field 328 along with most text properties (hyperlinks, bold, italic, different fonts, etc.) of the introduction field. In one embodiment of the invention, the text in the introduction field 328 will be encoded in Unicode.

The email message may be stored as a message or as a document to a message/document data file 318. Regardless of whether the email message is stored as a message or as a document, the envelope data 316 is said to "persist" with the stored message/document. That is, when envelope data has been changed by the user (with the document editor or the email client), the changes, including changes to the introductory text, will be saved with the document or email message in the message/document data file 318. As will be clear to those skilled in the art, the message/document file may be stored in either volatile memory (e.g., RAM 25) or non-volatile memory (e.g., Hard Disk Drive 27). Moreover, the message/document data file may be implemented as more than one data file.

Advantageously, the envelope can provide a means for "roundtripping" documents in the format provided by the document editor. By saving the message/document in a universally readable format (e.g., HTML—Hyper Text Markup Language), the email message can be opened and read by anyone with a browser or other application program capable of viewing the universal format. Thus, even recipients without a document editor compatible to that of the sender (i.e., the originating document editor) can view the document. Because the envelope integrates the functions of the document editor and the email client, however, the rich formatting of the originating document editor can also be saved and transmitted with the message/document. Thus, the rich formatting information is available for subsequent recipients that have document editors compatible with the originating document editor.

Those skilled in the art will appreciate that the document editor can be any application program or program module capable of producing a document. Document is used in this description to mean any item or collection of items that can be reproduced by a computer. In an illustrative embodiment, a document is any item or collection of items that can be represented in Hyper Text Markup Language (HTML). Similarly, those skilled in the art will appreciate that the email client can be replaced by any application program the functionality of which can be implemented within the context of the document editor.

The arrows between the components depicted in FIG. 3 indicate the flow of data and function calls between each of the components. A more detailed discussion of the interaction between these components will be provided in connection with FIGS. 5-6, below.

The Envelope User Interface

As discussed in connection with FIG. 3, in an illustrative embodiment of the present invention, the envelope 308 can be comprised of computer-executable instructions and data. The envelope of such an embodiment can be manifested to the user in the form of a graphical user interface, the Envelope User Interface (EUI) 410. The data component of the envelope is referred to as the "envelope data," which comprises the addressee, carbon copy, blind carbon copy, introductory text, and other information representing the user's instructions for delivery of the document as an email message.

Figure 4A:
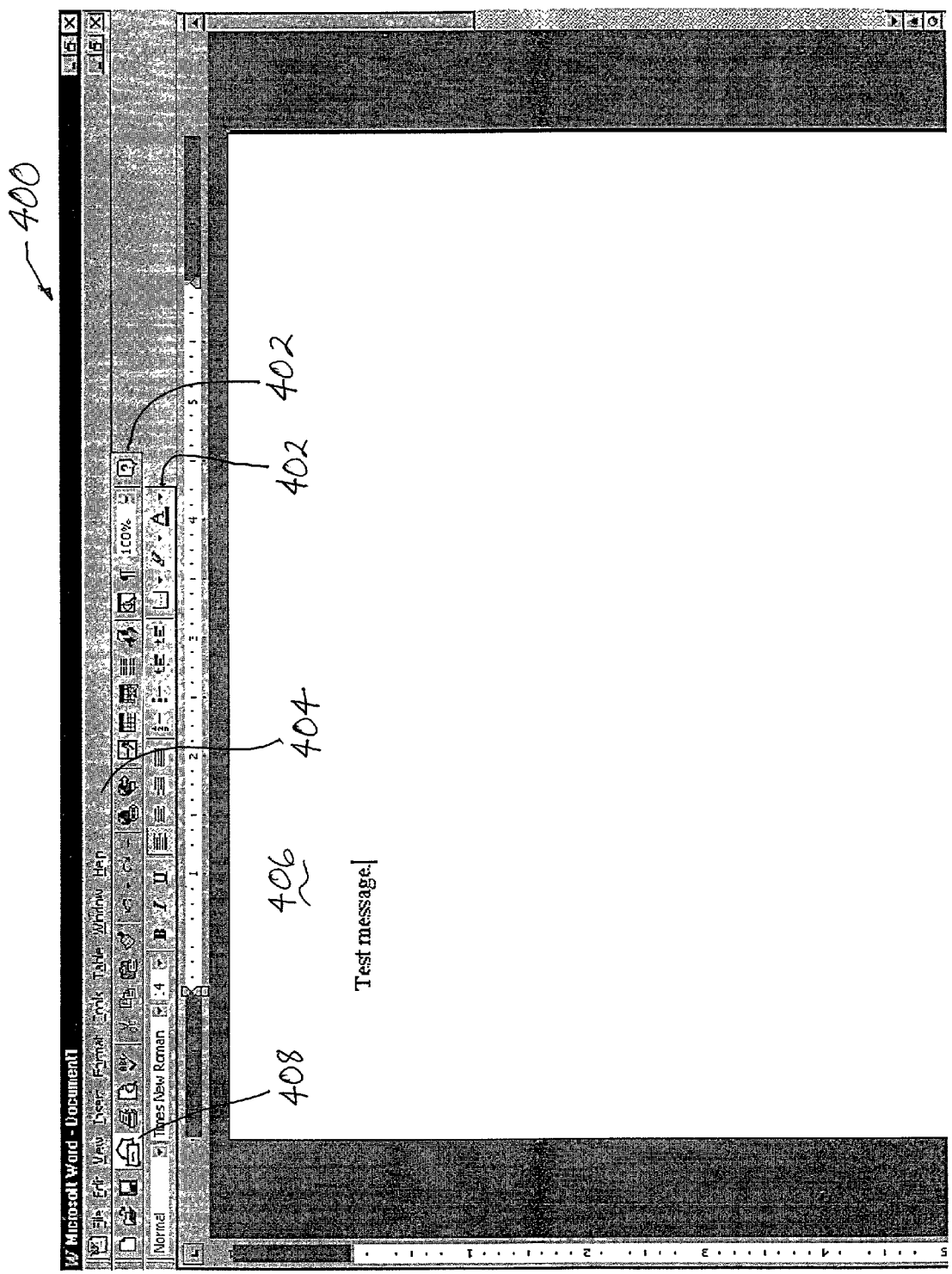
FIGS. 4a and 4b are pictorial representations of illustrative user interfaces of an illustrative embodiment of the present invention.

Referring now to FIG. 4a, an illustrative embodiment of the present invention is shown in the context of a word processing document editor. The DEUI 400 comprises the toolbars 402 and menus 404 for operating the "MICROSOFT WORD" word processing document editor. The editing region 406 of the DEUI 400 provides the display area in which the user will see the document that the user is generating or editing in the document editor. The editing region 406 contains the data that will constitute the message body of the email message, when the document (embodied in the editing region 406) is transmitted or stored as an email message. The contents of the editing region 406 is also referred to as the message content data.

Figure 4B:
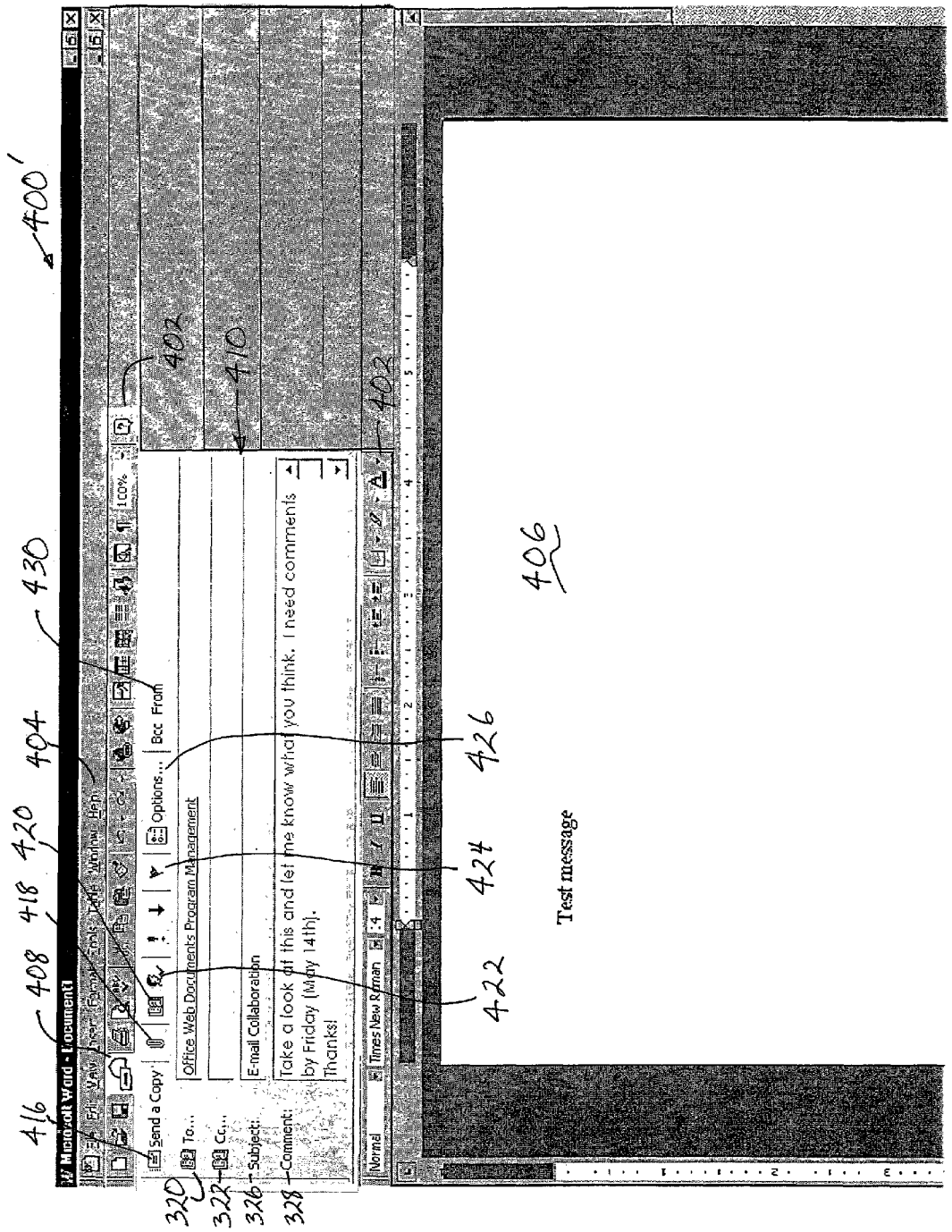

To invoke the envelope, the user can press an envelope enable button 408. Referring now to FIG. 4b, a DEUI 400' is depicted as it would exist following the user's pressing the envelope enable button 408. In this embodiment of the present invention, the envelope is embodied within EUI 410. The EUI provides all of the functionality of the envelope which, in turn, provides at least a subset of the functionality of the email client.

The EUI 410 is comprised of a group of function buttons and data fields. The TO data field 320 permits the user to input one or more recipients (addressees) to whom the email message will be transmitted. The SUBJECT data field 326 permits the user to provide a title for the email message, which can be displayed for quick reference by the recipient or by the sending user. The EUI 410 may also be equipped with a blind copy data field (not shown) and a carbon copy data field 322 for the purposes of transmitting the email message to other parties besides the addressee. The EUI 410 may also be equipped with an attachment data field (not shown) for attaching other documents and/or data files to the email message. In accordance with the present invention, the EUI also has the introduction field 328 as previously described.

The function buttons of the EUI 410, provide the user access to a subset of the email client's functions. The EUI 410 has a SEND button 416 that commands the envelope to transmit the email message in accordance with the data (i.e., envelope data) entered into the TO and SUBJECT data fields. The EUI 410 also has an attachment button 418, which permits the user to designate one or more files to be transmitted with the document as attachments (i.e., separate from the message body). An address book button 420 is also provided, permitting the user to check a predefined list of addressees to determine or verify email addresses. A check names button 422 is also provided for comparing the addressee names entered by the user against an address book. The user can mark the email message by clicking on the flag button 424 and can access email options by clicking on the options button 426. In addition, a button 430 may be provided to hide or display the blind copy data field or the FROM data field.

The EUI 410 can also be provided with other buttons not depicted in FIG. 4b for various other features. For example, a button for indicating that the message is a high or low priority message may be provided. Those skilled in the art will appreciate that buttons and other data fields and/or indicators can be used to integrate the full functionality of an email client into the EUI 410.

All of these functions are normally provided by the user's email client, but are integrated into the DEUI 400' and are fully functional within the context of the DEUI 400'. Advantageously, this reduces user confusion, because the functions have been provided by the EUI 410 without interfering with the look and feel of the DEUI 400'. Thus, the user's perception is that the functionality of the email client is seamlessly provided by the document editor (here, the word processor) without switching between operations or applications.

In addition, a user can utilize the EUI 410 within the context of the DEUI 400' to compose email messages, reply to received email messages, and forward received email messages. However, unlike previously available attempts at functionality integration, all of the address data, including the introductory text (envelope data), can be stored with the message data (message body) as part of a document. When reloaded from the data file 318, the document is readable and editable by the document editor, despite the fact that all of the address data is stored with it. Of course, the address data is available for use by the user, at any time the user chooses to invoke the EUI 410.

The Envelope OLE Interfaces

A conceptual definition of the envelope has been provided above, in connection with FIGS. 3 and 4. In an illustrative embodiment of the present invention, however, the envelope can be defined as a series of steps that provide for the functionality integration of the document editor and the email client. When the steps are invoked, the email client's functionality can be made available to the document editor's user and the document and envelope data generated within the document editor can be passed to the email client for delivery as an email message. In an illustrative embodiment of the present invention, the steps are performed by a series of function calls within the context of the OLE interface model described above. The interaction between the component objects of an illustrative embodiment of the present invention is referred to as the envelope interface.

Figure 5:
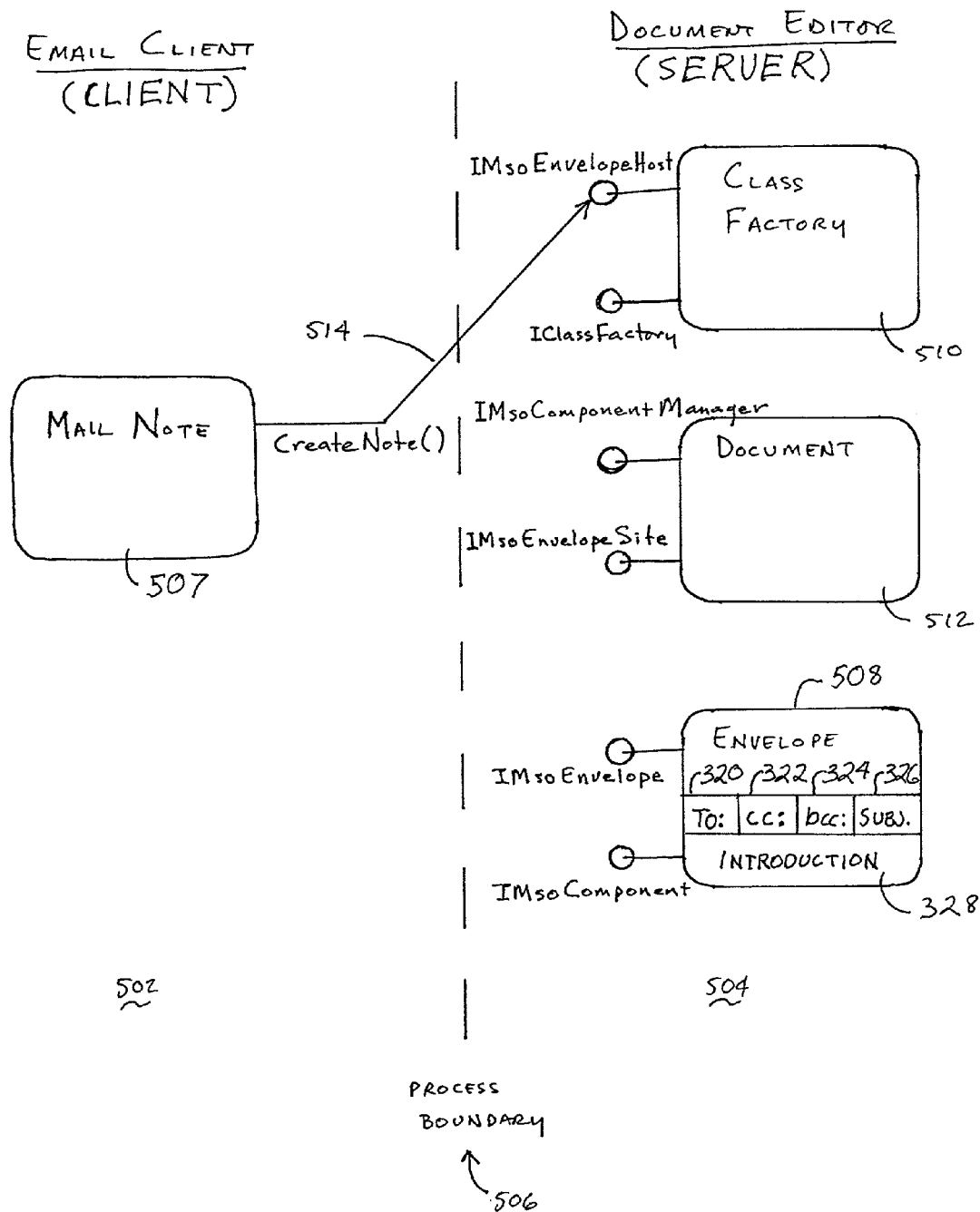
FIG. 5 is a block diagram depicting the interface between an email client and a document editor in an illustrative embodiment of the present invention.

Referring now to FIG. 5, an illustrative envelope interface diagram is shown, depicting the interaction between the email client on the left side 502 and the document editor on the right side 504. The processes are conceptually separated by the process boundary 506. The process boundary defines the barrier between the process space of the email client and the process space of the document editor. A number of logical components are involved in implementing the envelope interface. These components can be configured to follow the client/server model, wherein a client (the email client mail note 507) requests service from an envelope component 508.

FIG. 5 illustrates the components that are included on the client side 502 and the server side 504 of the envelope interface. The server side 504 includes a class factory 510 associated with the document editor. The class factory 510 is operative to generate new documents that are compatible with and editable by the document editor (e.g., a document having a network of empty cells for a spreadsheet document editor).

The server side 504 also includes a document component 512 and the envelope component 508. The document component 512 and the envelope component 508 may constitute a single object or may constitute separate objects. The lines and circles that extend from the class factory component 510, the document component 512, and the envelope component 508 represent the interfaces that are supported by each logical component. The client side 502 includes the mail note component 507. The IMsoenvelopeHost, IMsoenvelopeSite and IMsoenvelope interfaces are part of the envelope interface. The remaining interfaces, the IClassFactory, IMsoComponentManager, and IMsoComponent are part of the standard OLE interfaces designed to operate within the context of "MICROSOFT OFFICE" application program.

Primary Envelope Interfaces

In order for the envelope to be invoked, in this embodiment of the present invention, the mail note component 507 makes a CreateNote( ) function call 514. The CreateNote( ) function call 514 is sent to the IsoenvelopeHost interface of the class factory component 510 and causes the document editor to create a new document. Here, the document component 512 is created. The CreateNote ( ) function call 514 also causes the document editor to create the envelope component 508.

The document component 512 supports the Imsoenvelope-Site interface. This is the primary interface by which the document component 512 requests services from the envelope component 508.

The envelope component 508 supports the Imsoenvelope interface. This is the primary interface by which the envelope component 508 requests data from the document component 512. The envelope component 508 is also the logical component that controls the functionality associated with the addressee data 320, subject data 326, carbon copy recipient data 322, blind copy recipient data 324, and the introductory text data 328.

Figure 6A:
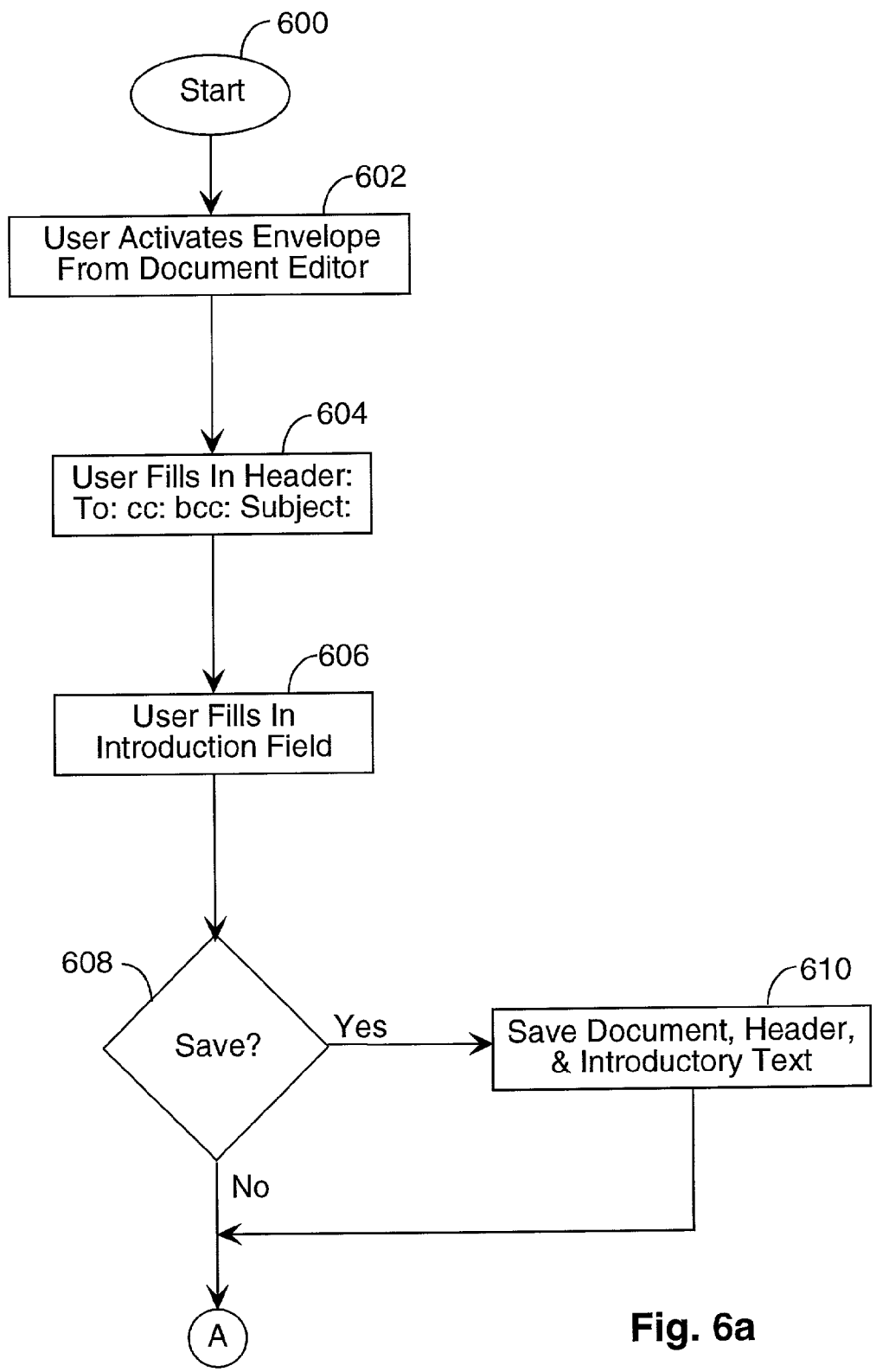
FIGS. 6a and 6b are portions of a single flowchart depicting a method of interfacing an email client and a document editor to send introductory text to a recipient in an illustrative embodiment of the present invention.
Figure 6B:
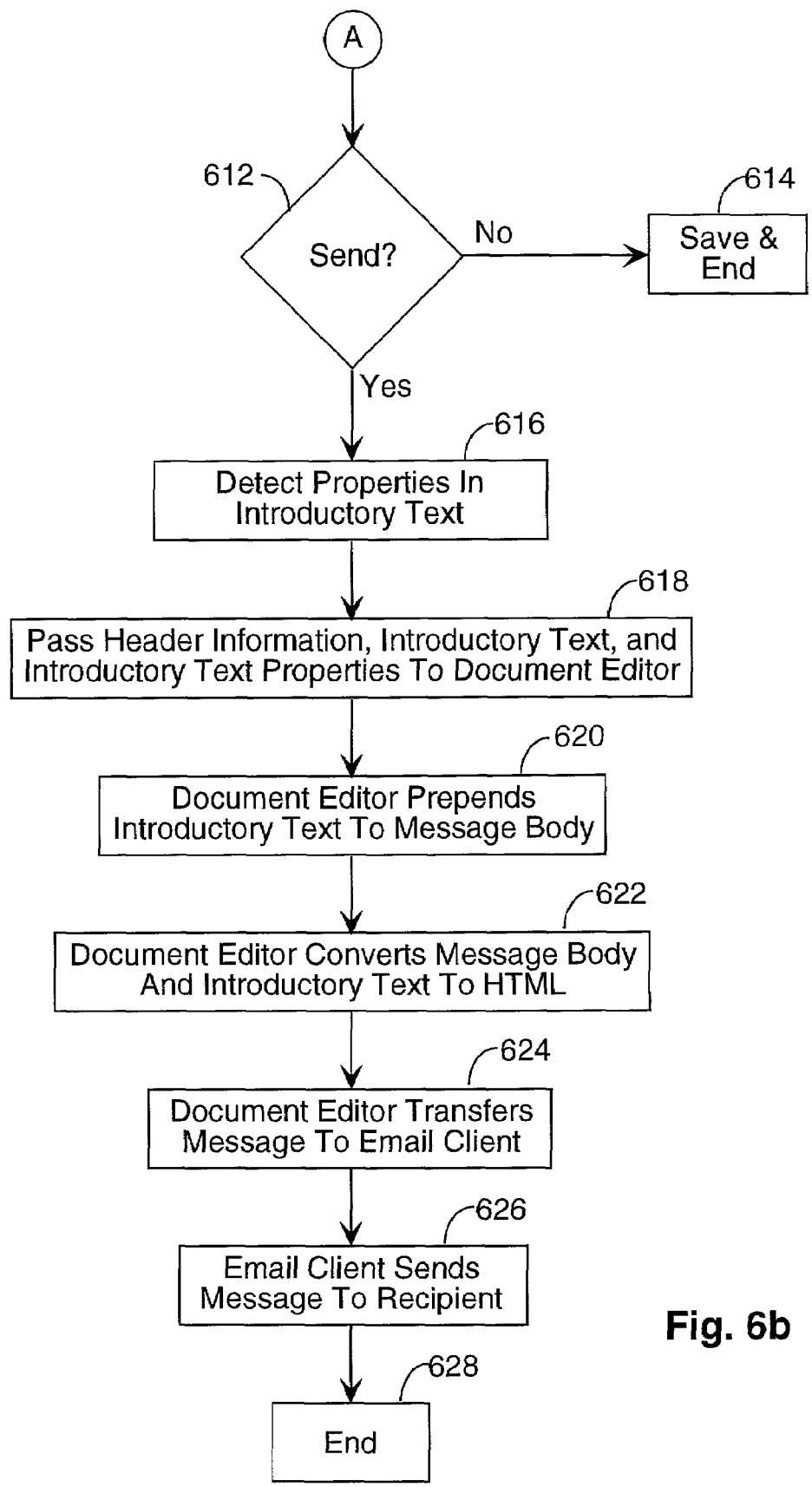

Referring now to FIGS. 6a and 6b, a flowchart is depicted, illustrating a method of an illustrative embodiment of the present invention when the user attempts to send an email message. The flowchart depicts the method as a series of steps. The method of the present invention begins at step 600 and proceeds to step 602 (FIG. 6a). At step 602, the user of the document editor 302 (FIG. 3) selects the envelope button 408 (FIG. 4a) to call the envelop user interface (EIU) 410 (FIG. 4b). Once the EIU 410 is displayed (FIG. 4b), the method proceeds to step 604 where the user fills in the envelope header information including the addressee data 320, subject data 326, carbon copy recipient data 322, and blind copy recipient data 324. From step 604, the method proceeds to step 606 where the user fills in the introductory text data into introduction field 328. As previously described, the introduction field 328 is a rich-edit control in plain text mode, similar to the subject field 326. The introduction field supports various text services to facilitate filling in the introductory text into the introduction field 328. Also as previously described the introductory text is encoded in Unicode.

Once the introduction field 328 is filled in at step 606, the method proceeds to step 608 where the method determines if the document (message body) 306 along with the envelope data 316 (FIG. 3) is to be saved based on instructions from the user. If the document (message body) 306 along with the envelope data 316 (FIG. 3) is saved by the user, the method follows the "yes" branch to step 610 where the document (message body) 306 along with the envelope data 316 (FIG. 3) are saved. The method then proceeds to step 612.

Alternatively, if at step 608 the user does not save the document, the method proceeds directly to step 612. At step 612, the method determines if the user has activated the send button 416. If the user has not activated the send button, the method follows the "no" branch to step 614 where the method saves the document and ends until the document is recalled for further processing by the user. Upon recall the method returns to step 600 thereby giving the user the opportunity to revise the saved document and all of the previously entered email header information including the introductory text.

If at step 612 the user activates the send button 416, the method follows the "yes" branch to step 616. At step 616, the method detects introductory text properties, such as hyperlinks, bold, italic, and different fonts present in the introductory text. At step 618, the envelope passes the introductory text including the text properties to the document editor. At step 620, the document editor prepends the introductory text to the body of the document. The introductory text may be separated from the message body of the document by a line (horizontal rule). At step 622, the document editor converts the introductory text and the body of the document to an HTML message (or other universally readable format). Converting the introductory text and the body of the document to an HTML message allows a recipient, who does not have the document editor used to create the document, to read the document with a standard email client or browser. Once the conversion process is complete at step 622, the document editor transfers the HTML email message to the email client (e.g., Outlook) at step 624. At step 626, the email client sends the email message to the recipient. At step 628, the method of the present invention ends.

When the email with the introductory text is received by the recipient, the recipient's email client displays the introductory text along with the message body. Because the introductory text was prepended to the message body separated by a line, most email clients will simply handle the HTML message in the ordinary course and display the introductory text before the body of the document. Such a display is implicit in normal email handling.

The reply to an email including introductory text involves handling the introductory text in connection with the reply. When the reply is initiated by means of the recipient's email client, the introductory text and the message body will be handled just as if the both together constituted the original message body. Therefore the reply message will display the original introductory text separated by a line from the original message. The reply message will be displayed before the original introductory text and the original message.

If, on the other hand, the recipient has the document editor that created the original message body, the recipient has the capability of editing the original message body. In that circumstance, the introductory text will be removed from the document when the edit command is chosen for revising the original document. The recipient may also use the document editor that created the original message to reply to the message and include a new introductory text. Such a reply is accomplished by first invoking the envelope from within the document editor just as if sending an original message. The original message body (including any edits to it) is displayed in the editing window 406 (FIG. 4a) without the introductory text. The original message and any edits can be identified as being the original message body by suitable identifying means such as ticking or different colors. The original introductory text is displayed in the introduction field and can be identified as the original introductory text using a suitable identifying means. Space above the original introductory text is provided in the introduction field for new introduction text for the reply message. When the send button is activated, the method of FIG. 6b starting with step 612 is invoked to transmit the message body and new introductory text back to the originator of the message.

Synopsis of the Detailed Description

The present invention provides a system and method for integrating the functionality of an email program (e.g., an email client) into a document editor (e.g., word processor) so that the user can send a document with introductory text to the recipient. The method of the present invention uses the envelope to access the email client's functionality from within the document editor. When the envelope is invoked a field, entitled the "introduction field", is displayed to the sender. The sender can then insert instructions or other pertinent introductory text for the recipient into the introduction field. The introduction field in the envelope is a rich edit control in plain text mode, similar to the subject field of the envelope. The introduction field may include services, such as auto complete and auto correct services. Once the introduction field has been filled in, the user clicks the send icon.

When the user sends the email, the envelope passes the introductory text to the document editor. The document editor prepends the introductory text to the body of the message separated from the body of the message by a line (horizontal rule). The document editor then converts the introductory text and the body of the document to an HTML message. Once this process is complete, the document editor transfers the HTML email message to the email client (e.g., Outlook). The email client then sends the email message to the recipient.

We claim:

1. A method for generating an electronic mail (email) message with introductory text within a document editor by invoking an envelope operative for integrating the functionality of a first email client and the document editor, the method comprising the steps of:
   activating the envelope that is operative to integrate the functionality of the first email client and the document editor, wherein the envelope includes an introductory field;
   receiving envelope data as an input, the envelope data being associated with the email message and including header information and introductory text associated with the introductory field of the envelope;
   displaying an Envelope User Interface (EUI) associated with the email message, the EUI comprising the envelope data including displaying the introductory text in the introductory field;
   displaying a Document Editor User Interface (DEUI), the DEUI comprising an original document associated with a document editor;
   invoking the envelope to transmit the introductory text of the introductory field from the envelope to the document editor; and
   causing the first email client to append the introductory text to the original document in the document editor to generate appended document, wherein the appended document is configured to display the introductory text within the appended document when the appended document is opened on a second email client of a recipient, wherein the first email client is configured to transmit the appended document to the recipient while maintaining the original document with a sender, wherein the original document is maintained without the introductory text.

2. The method of claim 1, wherein the introduction field is a rich edit control.

3. The method of claim 1, wherein the introductory text in the introduction field is formatted in Unicode.

4. The method of claim 1, wherein invoking the envelope further includes detecting introductory text properties in the introductory text and sending the envelope data including header information, the introductory text, and the introductory text properties to the document editor.

5. The method of claim 1, wherein the appending step further includes prepending the introductory text to the original document.

6. The method of claim 1, wherein invoking the envelope further includes converting the appended document to a universal format prior to sending the email message.

7. A computer system for generating an electronic mail (email) message with introductory text within a document editor, comprising:
   a processing unit;
   an input device connected to the processing unit; and
   a display device connected to the processing unit;
   the processing unit, responsive to instructions from the document editor, an email client, and an envelope running on the computer system, being operative to:
      display a Document Editor User Interface (DEUI) on the display device;
      display an Envelope User Interface (EUI) on the display device;
      receive envelope data including header information and the introductory text from the input device, the envelope data associated with the email message;
      receive original message body data from the input device, the original message body data associated with a word processing document of the document editor;
      display selected portions of the envelope data within a portion of the EUI including displaying the introductory text in an introduction field;
      display selected portions of the original message body data within a portion of the DEUI; and
      in response to the receipt of a send signal from the input device,
         transmit the introductory text from the envelope to the document editor;
         cause the EUI to paste the introductory text in the original message body in the document editor to generate an appended message body that includes the original message body having the introductory text; and
         invoke the envelope to transmit the appended message body to a recipient while maintaining the original message body with a sender so that the sender maintains the original message body without being required to remove the appended introductory text.

8. The system of claim 7, wherein the introduction field is a rich edit control.

9. The system of claim 7, wherein the introductory text in the introduction field is formatted in Unicode.

10. The system of claim 7, wherein invoking the envelope by means of the processor unit further includes detecting introductory text properties in the introductory text and sending the envelope data including header information, the introductory text, and the introductory text properties to the document editor.

11. The system of claim 7, wherein the appending the introductory text to the original message body further includes prepending the introductory text to the original message body.

12. The system of claim 7, wherein invoking the envelope further includes converting the appended message body to a universal format prior to sending the email message.

13. A method for generating an electronic mail (email) message with introductory text, within a document editor by invoking an envelope operative for integrating the functionality of an email client and the document editor, the method comprising the steps of:
   providing the document editor and the email client envelope, wherein the email client envelope includes an introductory text field with the introductory text and the document editor includes an original document; and
   causing the email client envelope to generate an appended document by pasting the introductory text of the email client envelope in the original document prior to sending the email, wherein the appended document displays the introductory text within the appended document when the appended document is opened by a recipient, wherein the email client is configured to transmit the appended document to the recipient while maintaining the original document with a sender so that the sender maintains the original document without being required to remove the pasted introductory text.

14. A method for generating an electronic mail (email) message with introductory text, within a document editor by invoking an envelope operative for integrating the functionality of an email client and the document editor, the method comprising the steps of:

providing the document editor, the email client, and the envelope, wherein the envelope includes the introductory text and the document editor includes original message body text;

passing the introductory text of the envelope to the document editor, wherein the document editor generates an appended message body by pasting the introductory text into the original message body text;

converting the appended message body to a universal format; and transferring the appended message body to the email client, wherein the email client is configured to send the appended message body to a recipient while maintaining the original message body text with a sender so that the sender maintains the original message body text without being required to remove the pasted introductory text.

\* \* \* \* \*